United States Patent Office 2,879,258
Patented Mar. 24, 1959

2,879,258
BIS(SALICYLOYL) BENZENE DERIVATIVES AND COMPOSITIONS CONTAINING THE SAME

Carl B. Havens, Hope, Mich., assignor to The Dow Chemical Company, Midland, Mich., a corporation of Delaware No Drawing. Application December 1, 1955
Serial No. 550,487

4 Claims. (Cl. 260—45.95)

This invention relates to new organic compounds and to polymeric compositions containing the same. More particularly, it relates to bis(chlorosalicyloyl) benzene and to polymeric compositions stabilized with the same.

Many polymers, such as haloethylene polymers, are subject to rapid and severe degradation and consequent discoloration upon exposure to sunlight. To overcome that disadvantage it has been found necessary to incorporate certain additives into compositions containing such polymers. Various compounds having a carbonyl group attached to a benzene ring in an ortho position to a hydroxyl group have been known to have utility as light stabilizers in such compositions. Several of those compounds, however, are odoriferous and volatile. Any odor in the stabilizer will be transferred to the stabilized composition thus greatly reducing the merchandisability of any article prepared from the composition. Also, a volatile ingredient in a polymeric composition will gradually volatilize out of the composition leaving the composition unprotected.

Such compounds vary in their effectiveness for absorbing ultraviolet light and vary in their compatibility with the polymer employed in the composition. Thus, it is impossible to predict the effectiveness of any particular compound as a light stabilizer for any given polymer.

It is accordingly the principal object of this invention to provide a new group of organic compounds having the stated utility.

It is a further object to provide a polymeric composition stabilized against the degradative effects of light by means of such compounds.

The above and related objects are accomplished by means of ortho-bis(monochlorosalicyloyl) benzene having the following general formula:

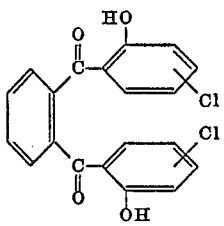

wherein the chlorine may be substituted anywhere on the aromatic nucleus, and by means of thermoplastic compositions comprising such compounds together with haloethylene polymers.

The method of preparation of the compounds will be illustrated by the following preparation of o-bis(5-chlorosalicyloyl) benzene. One mole of phthalic acid, di-4-chlorophenyl ester and a large excess of AlCl$_3$ were ground and mixed and heated at 150° C. for 15 minutes. The reaction mixture was then cooled, ground, and added to a stirred excess of ice and HCl. The product was washed twice with dilute HCl and three times with water. The product was then recrystallized from a 50–50 solution of toluene and alcohol. The melting point of the recrystallized material was 197.4°–198.4° C.

The compounds were evaluated as light stabilizers for haloethylene polymers. Because of their low odor level they produced compositions which were more merchandisable than compositions prepared from previous stabilizers. In addition, their low volatility caused a more permanent stabilization than prior compounds.

As light stabilizers the compounds may be employed in an amount of from 0.5 to 6 percent by weight based on the weight of the polymer employed. It is possible to use the compounds in conjunction with other known stabilizers.

The compounds of this invention have been found to be particularly effective in stabilizing those copolymers of vinylidene chloride and another copolymerizable monomer, such as vinyl chloride, in which the vinylidene chloride is present in an amount of at least 50 percent by weight.

The effectiveness of the stabilizing compounds of this invention will be more apparent from the following illustrative example in which all parts and percentages are by weight.

EXAMPLE

A series of samples was prepared from a basic formulation consisting of 95 parts of a copolymer prepared from 85 percent vinylidene chloride and 15 percent vinyl chloride and 5 parts of acetyl triethyl citrate as a plasticizer. To some of the samples of the basic formulation was added an amount of a stabilizer of this invention. Another series of samples used 2-hydroxy-5-chlorobenzophenone, a known stabilizer, for comparative purposes one of the samples was left blank. The amounts of stabilizer used in each sample is shown in the table. The samples were molded into sheets 0.01 inch thick and exposed for 3 months to direct sunlight in the State of Florida. After exposure the sheets were examined visually for darkening. The results are listed in the following table.

Table

| Stabilizer | Percent by weight | Color after 3 months exposure |
|---|---|---|
| None | | dark brown. |
| 2-hydroxy-5-chlorobenzophenone | 0.5 | brown. |
| Do | 1.0 | Do. |
| Do | 2.0 | light tan. |
| o-bis(5-chlorosalicyloyl) benzene | 3.0 | darkened very slightly. |
| Do | 6.0 | Do. |

It can be seen that the derivatives of this invention provide appreciably greater protection to the polymer composition against the degradative effects of sunlight than does a known light stabilizer.

I claim:
1. As a new organic compound, an ortho-bis(monochlorosalicyloyl) benzene having the general formula:

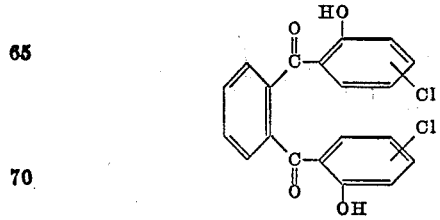

2. As a new organic compound, an ortho-bis(5-chloro-salicyloyl) benzene having the formula:

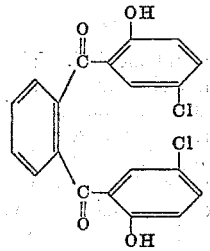

characterized by being a solid melting at 197.4°–198.4° C.

3. A thermoplastic composition comprising a haloethylene polymer and from 0.5 to 6.0 percent by weight of an ortho-bis(monochlorosalicyloyl) benzene having the general formula:

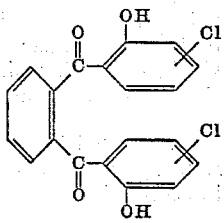

4. The composition claimed in claim 3 wherein the ortho-bis(monochlorosalicyloyl) benzene is ortho-bis(5-chlorosalicyloyl) benzene.

References Cited in the file of this patent

UNITED STATES PATENTS

| | | |
|---|---|---|
| 2,182,786 | Coleman et al. | Dec. 12, 1939 |
| 2,341,851 | Adams | Feb. 15, 1944 |
| 2,419,553 | Houtman | Apr. 29, 1947 |
| 2,519,189 | Houtman | Aug. 15, 1950 |
| 2,659,709 | Daglish et al. | Nov. 17, 1953 |

FOREIGN PATENTS

| | | |
|---|---|---|
| 680,409 | Great Britain | Oct. 1, 1952 |

OTHER REFERENCES

Buu Hoi, "Chemical Abstracts," vol. 34, 1940, p. 4151.